United States Patent [19]

Sota et al.

[11] Patent Number: 4,869,410

[45] Date of Patent: Sep. 26, 1989

[54] MAGNETIC TAPE CONTAINER

[75] Inventors: Kouichi Sota; Toshiaki Sima; Hirokazu Yoshida, all of Tokyo, Japan

[73] Assignee: Otari Electric Co., Ltd., Tokyo, Japan

[21] Appl. No.: 274,190

[22] Filed: Nov. 21, 1988

[30] Foreign Application Priority Data

Nov. 24, 1987 [JP] Japan .................. 62-296994

[51] Int. Cl.⁴ ........................................... B65H 20/02
[52] U.S. Cl. ..................................... 226/97; 226/118; 226/181; 226/196
[58] Field of Search ...................... 226/7, 97, 118, 181, 226/196; 242/182

[56] References Cited

U.S. PATENT DOCUMENTS

| | | | |
|---|---|---|---|
| 2,979,244 | 4/1961 | Pouliart et al. | 226/118 |
| 3,185,400 | 5/1965 | Maxey . | |
| 3,286,895 | 11/1966 | Poumakis | 226/97 X |
| 3,405,855 | 10/1968 | Daly et al. | 226/97 X |
| 3,499,589 | 3/1970 | Johnson et al. | 226/97 |
| 4,128,198 | 12/1978 | Woodley | 226/97 |
| 4,213,159 | 7/1980 | King | 226/95 X |
| 4,469,265 | 9/1984 | Manquen | 226/97 |
| 4,698,701 | 10/1987 | Gantzhorn, Jr. et al. | 360/16 |

FOREIGN PATENT DOCUMENTS

| | | |
|---|---|---|
| 94602 | 12/1976 | Japan . |
| 114549 | 1/1982 | Japan . |
| 142779 | 9/1987 | Japan . |

*Primary Examiner*—David Werner
*Attorney, Agent, or Firm*—David O'Reilly

[57] ABSTRACT

A magnetic tape container for use in combination with a magnetic tape duplicating apparatus in which a long, endless, master magnetic tape is circulated to produce many duplicates of the master magnetic tape. The magnetic tape container has most of the long, endless, master magnetic tape in a zigzag fashion for circulating the master magnetic tape through the magnetic tape duplicating apparatus. The magnetic tape container is comprised of a tape case, a feed mechanism having a capstan disposed near the entrance of the tape case, a pinch roller mounted for free rotation on a swing lever being brought into contact with the capstan or retracted from the capstan, provided with at least one annular air guide groove in the circumference thereof. A first tape guide is disposed near the capstan, and a second tape guide is disposed near the pinch roller opposite to the first tape guide to form a gap between the first tape guide and the second tape guide. An air blowing member is disposed near the pinch roller to blow air toward a gap between the second tape guide and the pinch roller so that air blown by the air blowing member flows through the gap between the pinch roller and the second guide and through the annular air guide groove of the pinch roller to impinge on the magnetic tape to separate it from the pinch roller, so that the surface of the magnetic tape facing the pinch roller is not abraded by the pinch roller.

12 Claims, 2 Drawing Sheets

MAGNETIC TAPE CONTAINER

FIELD OF THE INVENTION

The present invention relates to a magnetIo tape container to contain and run a long magnetic tape in a zigzag fashion, for use in combination with a magnetic tape duplicating apparatus for producing many duplicates of a master magnetic tape at a high speed.

BACKGROUND OF THE INVENTION

A magnetic tape duplicating apparatus is available for producing many duplicates from a long endless circulated master magnetic tape carrying a record. Accordingly, the magnetic tape duplicating apparatus is provided with a magnetic tape container to contain the long endless master magnetic tape in a zigzag fashion for running.

Magnetic tape containers are disclosed, for example, in Japanese Utility Model Laid-open (Kokai) No. 48-44814 and Japanese patent Publication No. 60-57142. A known typical magnetic tape container has a tape case for containing a magnetic tape, and a feed mechanism for feeding the magnetic tape into the tape case. The feed mechanism is disposed at the entrance of the tape case, and comprises a capstan and a pinch roller. The capstan is rotatably driven by a motor to draw the magnetic tape. The pinch roller is a rotary rubber roller capable of being brought into contact with the capstan. The magnetic tape Is pinched between the capstan and the pinch roller and is driven by the capstan.

There is a problem that the conventional tape container may damage the magnetic tape, because the magnetic tape runs unstably at the entrance to the tape case due to a reduction in tension of the magnetic tape to zero in the tape case and, consequently, the magnetic tape may wind around the capstan or pinch roller, or the magnetic tape may be pressed hard against the wall of the tape case. If the magnetic tape winds around the capstan or pinch roller, the magnetic tape may be creased and become unusable. If the magnetic tape runs with the recording surface in contact with the wall at the entrance of the tape case, the recording surface may be scratched reducing the life of the magnetic tape.

BRIEF DESCRIPTION OF THE INVENTION

Accordingly, it is an object of the present invention to provide a tape container for use in combination with a magnetic tape duplicating apparatus, capable of containing a long endless master magnetic tape so that the magnetic tape can run smoothly and will not be damaged by repeated circulation.

To achieve this object, the present invention provides a magnetic tape container comprised of a tape case, a capstan, a first tape guide disposed near the capstan to guide a magnetic tape case, a pinch roller having at least one air guide groove formed in the outer circumference thereof, a second tape guide disposed near the pinch roller opposite the first tape guide with respect to the magnetic tape, and an air blowing member for blowing air toward the air guide groove so that the magnetic tape is separated from the pinch roller after passing by the nip line of the pinch roller.

Air blown by the air blowing member toward the air guide groove of the pinch roller flows through the air guide groove and impinges on the magnetic tape delivered by the capstan and the pinch roller to separate the magnetic tape from the pinch roller and presses the magnetic tape against the first tape guide disposed near the capstan. Consequently, the magnetic tape cannot wind around the pinch roller and will not come into contact with the second tape guide since the magnetic tape is pressed against the first tape guide. Accordingly, when the magnetic tape has a recording surface facing the second tap guide, the recording surface of the magnetic tape does not come into contact with the second tape guide.

The above and other features of this invention will be fully understood from the following detailed description and the accompanying drawings, in which:

DETAILED DESCRIPTION OF THE INVENTION

Figure 1:
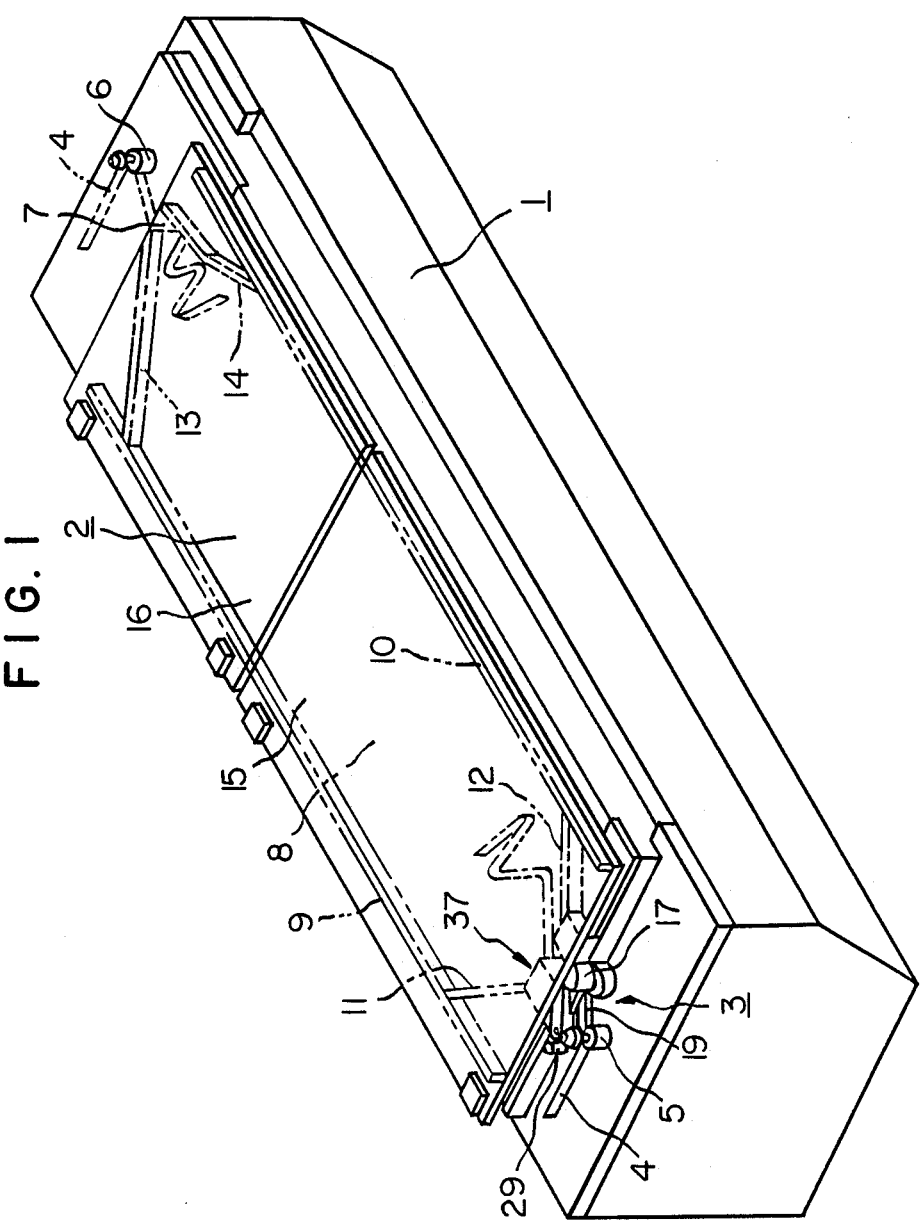
FIG. 1 is a perspective view of a magnetic tape container according to the preferred embodiment of the present invention.

Referring to FIG. 1, magnetic tape container 1 is comprised of tape case 2 and feed mechanism 3 for feeding magnetic tape 4 into tape case 2. Magnetic tape 4 is guided by guide roller 5 provided on tape case 2 to feed mechanism 3, and then feed mechanism 3 feeds magnetic tape 4 into tape case 2. Magnetic tape 4 pulled out through exit 7 from tape case 2 is guided by guide roller 6 provided on tape case 2.

Tape case 2 comprises base plate 8, guide strips 9, 10, 11, 12, 13 and 14 attached to base plate 8, and cover plates 15 and 16 covering guide strips 9 through 14. Guide strips 11 and 12 define entrance 37, while guide strips 13 and 13 define exit 7. The height of the guide strips is slightly greater than the width of magnetic tape 4. Magnetic tape 4 is contained in a zigzag fashion between base plate 8 and cover plates 15 and 16.

Figure 2:
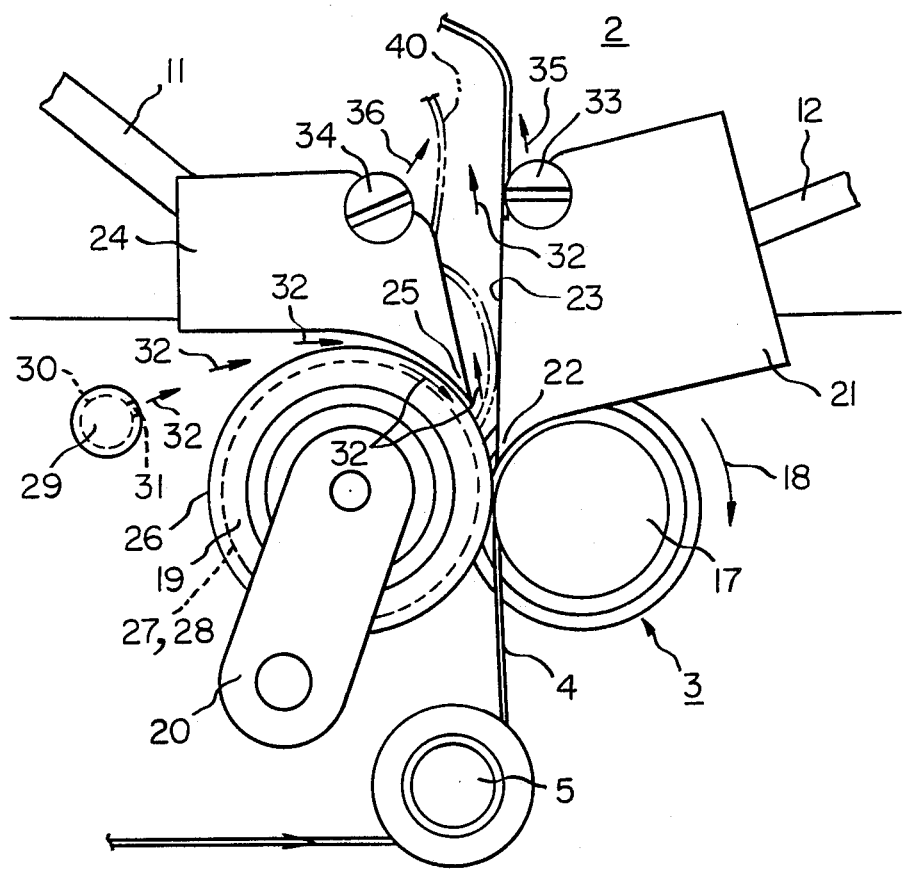
FIG. 2 is an enlarged plan view of a feed mechanism incorporated into the magnetic tape container of FIG. 1.

Referring to FIG. 2, feed mechanism 3 is comprised of capstan 17, pinch roller 19 rotatably supported on swing arm 20, first tape guide 21 disposed near capstan 17, and second tape guide 24 disposed near pinch roller 19. Capstan 17 is driven by a motor, (not shown), for rotation in the direction of arrow 18. Magnetic tape 4 is pinched between capstan 17 and pinch roller 19 and runs by being driven by capstan 17. First tape guide 21 has a sharp nose 22 defined by surfaces forming an acute angle and is disposed with nose 22 close to the circumference of capstan 17. First tape guide 21 has a smooth, flat tape guide surface 23. Second tape guide 24 has a sharp nose 25 defined by surfaces forming an acute angle, and is disposed with nose 25 close to circumference 26 of pinch roller 19. First tape guide 21 and second tape guide 24 are disposed relative to each other so that a gap for receiving magnetic tape 4 is formed between their opposing surfaces. Air blowing member 29 is provided near the pinch roller 19. Air blowing member 29 has an air chamber 30 connected to a high-pressure compressed air source, (not shown), and opening 31 for blowing air therethrough.

Figure 3:
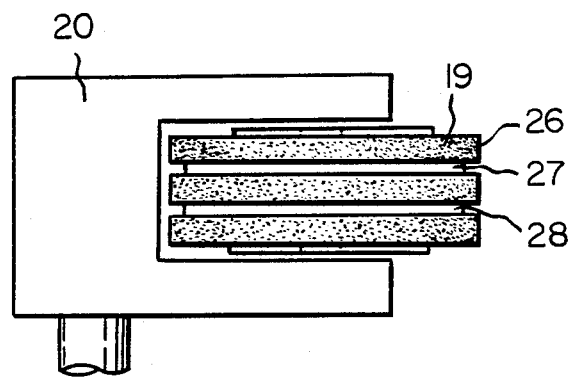
FIG. 3 is a side elevation of a pinch roller employed in the magnetic tape container of FIG. 1.

As shown in FIG. 3, two annular air guide grooves 27 and 28 are formed in the circumference of pinch roller 19.

Air blown through opening 31 flows as indicated by arrows 32 through air guide grooves 27 and 28 of pinch roller 19, impinges on magnetic tape 4 to press the magnetic tape against guide surface 23 of first tape guide 21, and then flows out through tape case 2. Air blowing posts 33 and 34 are provided respectively on opposite sides of the gap between first tape guide 21 and second tape guide 24 to blow air respectively in the direction of arrows 35 and 36.

In operation, pinch roller 19 is brought into contact with capstan 17 to feed magnetic tape 4 into tape case 2, while air is blown from air blowing member 29 to separate the magnetic tape from pinch roller 19 and to press the magnetic tape against guide surface 23 of first tape guide 21. If air blowing member 29 is not provided and not air current acts on magnetic tape 4, magnetic tape 4 will run irregularly, as indicated by phantom lines 40 in FIG. 2, through the gap between first tape guide 21 and second tape guide 24. Air blown by air blowing member 29 makes the magnetic tape run through the gap between first tape guide 21 and second tape guide 24 stably, so that magnetic tape 4 will not wind around capstan 17 or pinch roller 19. Since magnetic tape 4 is extended so that the recording surface thereof is on the side of second tape guide 24, the recording surface of the magnetic tape 4 will not come into contact with second tape guide 24 and hence the recording surface will not be scratched.

Thus, a tape container constructed according to the present invention will not damage magnetic tape 4.

Although the invention has been described in its preferred form with a certain degree of particularity, obviously many variations and changes are possible therein. It is therefore to be understood that the present invention may be practiced otherwise than as specifically described herein without departing from the scope and spirit thereof.

This invention is not to be limited by the embodiment shown in the drawings and described in the description which is given by way of example and not of limitation, but only in accordance with the scope of the appended claims.

What is claimed is:

1. A tape container for containing and feeding a long magnetic tape in a zigzag fashion, comprising:
   a tape case having an entrance and an exit;
   a capstan provided at the entrance of said tape case;
   a pinch roller mounted on a swing lever for free rotation so as to be brought into contact with said capstan for feeding said magnetic tape;
   characterized by;
   an air blowing member disposed near said pinch roller to blow compressed air toward said pinch roller so that said magnetic tape is separated from the pinch roller after the same has passed a nip line between said capstan and said pinch roller.

2. A tape container according to claim 1, including at least one annular air guide groove formed in the circumference of said pinch roller, said compressed air being blown by said air blowing member flowing through said at least one air guide groove in said pinch roller to a tape separating position.

3. A tape container according to claim 1, including a tape guide having a surface extending along a portion of the circumference of said pinch roller being disposed near said pinch roller so as to form an air path between said tape guide and said pinch roller; compressed air blown by said air blowing member flowing through an air path between said tape guide and said pinch roller to a tape separating position.

4. A tape container according to claim 1, including at least one annular air guide groove formed in the circumference of said pinch roller; a second tape guide having a surface extending along a portion of the circumference of said pinch roller being disposed near said pinch roller so as to form an air path between said second tape guide and said pinch roller; whereby compressed air blown by said air blowing member flows through air path and said air guide groove to a tape separating position.

5. A tape container for containing and feeding a long magnetic tape in a zigzag fashion, comprising;
   a tape case having an entrance and an exit;
   a capstan disposed on said tape case near said entrance;
   a pinch roller supported on a swing lever for rotation so as to be brought into contact with said capstan; characterized by;
   a first tape guide for guiding said magnetic tape into said tape case disposed near said capstan;
   a second tape guide disposed near said pinch roller opposite said first tape guide with respect to said magnetic tape at least one annular air guide groove formed in the circumference of said pinch roller: and an air blowing member provided to blow air toward said air guide groove so that said magnetic tape is separated from said pinch roller.

6. A magnetic tape container feeding system for feeding a long magnetic tape stored in said container in a serpentine arrangement comprising;
   a tape case having an entrance and an exit;
   a capstan provided adjacent said entrance to said tape case;
   a pinch roller;
   pivotal mounting means pivotally mounting said pinch roller to swing into contact with or away from said drive capstan;
   air blowing member disposed adjacent said pinch roller for directing forced air toward the nip where said pinch roller contacts said capstan;
   whereby said magnetic tape is separated from said pinch roller after passing through said nip between said pinch roller and capstan.

7. The tape feeding system according to claim 6 in which said pinch roller has at least on annular circumferential groove; said air blowing member constructed to direct at least a portion of said forced air into said annular circumferential groove.

8. The tape feeding system according to claim 7 in which said at least one circumferential groove is two annular circumferential groovers.

9. The tape feeding system according to claim 6 including one or more tape guides disposed adjacent said capstan and pinch roller; said one or more tape guides having a surface extending along a portion of said capstan and pinch roller forming an air path along the travel path of said magnetic tape to a tape separating position.

10. The tape feeding system according to claim 9 in which there are two tape guides positioned adjacent said capstan and said pinch roller respectively.

11. The tape feeding system according to claim 7 including one or more tape guides disposed adjacent said capstan and pinch roller; said one or more tape guides having a surface extending along a portion of said capstan and pinch roller forming an air path along the travel path of said magnetic tape to a tape separating position.

12. The tape feeding system according to claim 11 in which there are two tape guides positioned adjacent said capstan and said pinch roller respectively.

* * * * *